L. M. KOLB.
AUTO SIGNAL.
APPLICATION FILED OCT. 29, 1921.

1,417,388. Patented May 23, 1922.

Louis M. Kolb.
INVENTOR

BY Victor J. Evans
ATTORNEY

WITNESS:

UNITED STATES PATENT OFFICE.

LOUIS M. KOLB, OF PHILADELPHIA, PENNSYLVANIA.

AUTO SIGNAL.

1,417,388. Specification of Letters Patent. Patented May 23, 1922.

Application filed October 29, 1921. Serial No. 511,242.

*To all whom it may concern:*

Be it known that I, LOUIS M. KOLB, a citizen of the United States, residing at Philadelphia, in the county of Philadelphia and State of Pennsylvania, have invented new and useful Improvements in Auto Signals, of which the following is a specification.

This invention relates to direction signals and it has more particular reference to signalling devices for attachment to or upon automobiles and by the use of which the driver can give a visible indication of the intended turn about to be made or notice when about to stop.

The primary object of this invention is the provision of an auto-signal the operating handle whereof can be located within easy reach of the driver.

Another object is to provide a device of the kind referred to which can be easily clamped upon the windshield or strap frame of an automobile and readily adjusted for either left or right hand driven machines.

A further object of this invention is to provide a device of the type specified which will be equally serviceable either by day or at night.

Still further this invention has for an object to provide a simple, cheap and inexpensive auto-signal that comprises but few and easily constructed parts which will operate effectively for the purpose intended, and furthermore, a device that cannot readily be put out of commission or become deranged under normal service conditions.

With the foregoing and other objects in view as will be more apparent from the following description my invention consists essentially in the novel features of construction, combinations and arrangements of parts hereinafter fully disclosed and more specifically defined by the appended claims.

In the further disclosure of the invention reference is to be had to the accompanying sheet of explanatory drawings constituting a part of this specification, and in which like characters of reference designate the same or corresponding parts in all the views.

Figure 1:
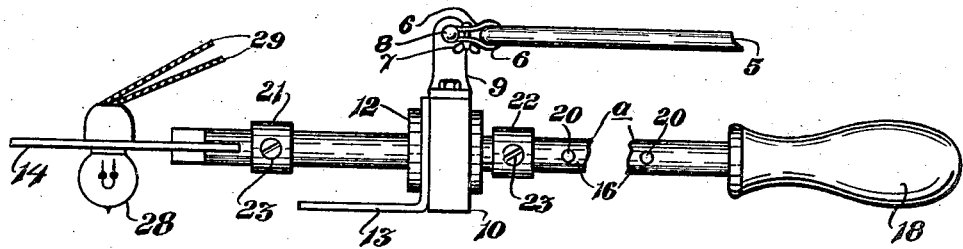

Figure 1—is a broken top plan view of my improved auto-signal as applied to the windshield of an automobile.

Figure 2:
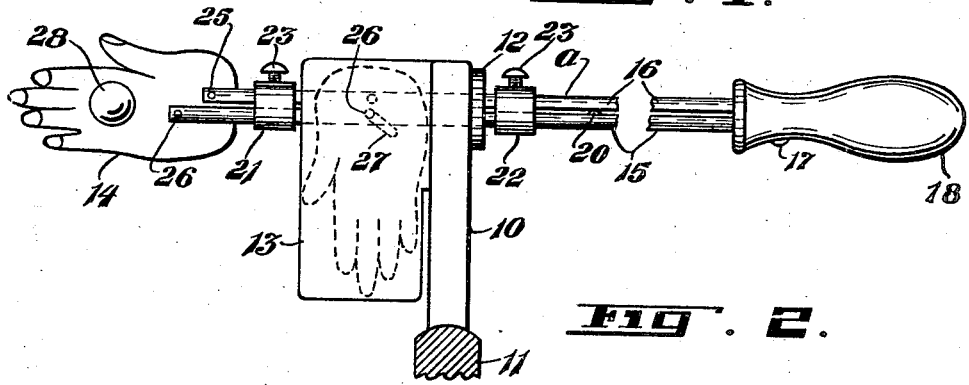

Figure 2—is a front view of the same.

Figure 3:
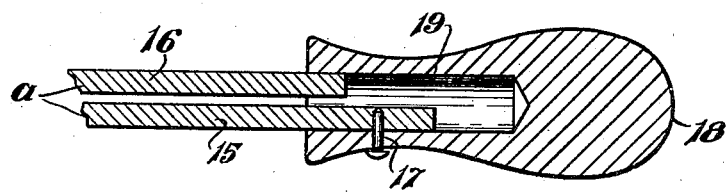
Figure 4:
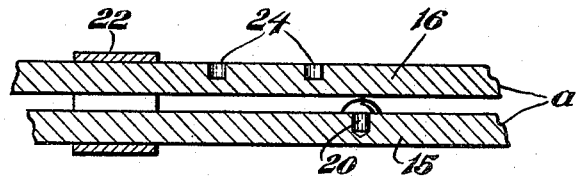

Figure 3— is an enlarged fragmentary detail view of the operating handle and associated parts; and, Figure 4—is a correspondingly enlarged sectional detail hereinafter more particularly referred to.

Referring more particularly to the views and in accordance with the embodiment of my invention illustrated a fragmentary portion of an automobile windshield is designated by the numeral 5 and to which my auto-signal can be conveniently connected by means of a pair of clamping jaws 6 under the control of a winged nut 7 or the like. These clamping jaws 6 are appropriately pivoted on a pin 8 on a bracket 9 that is in turn bolted to a standard or support 10 arranged to seat on the upper edge of an automobile body 11 or be located in any other desired position. Journaled in the aforesaid standard or support 10 is a tubular coupling 12 between the one collar whereof and said support 10 is a shield or angle plate 13 behind which the signalling arm or hand 14 normally reposes.

Arranged for axial sliding movement through the tubular coupling 12 is a longitudinally split rod *a* comprising two halves or portions 15, 16, the former of which has secured thereto by means of a pin or screw 17 an operating handle 18, whilst the latter is adapted for sliding movement in the bore 19 thereof for the purpose later on explained. Spaced pins or screws 20 serve to maintain the aforesaid halves or portions 15, 16, in slightly separated relation whilst at the same time furnishing an effective means to prevent any tendency to frictional binding between said parts. Collars 21, 22 connectable to the rod *a* by set screws 23 passing therethrough into holes 24 in the part 15 serve to limit its longitudinal movement as well as making provision for the accurate adjustment of the signal device 14, as well as making provision for the movement of said signal device into and away from signalling position as hereafter set forth.

The signalling arm or hand 14 is pivotally mounted at 25 between the split outer end of the half portion 15 of the rod *a* and it is operably connected to the other half portion 16 by means of a pin or the like 26 engaging in a cam slot 27 therein and it is to be observed that the signalling device proper is preferably fashioned to simulate a human hand as shown.

In order to provide a means whereby the signalling arm or hand 14 may be clearly seen after dark I preferably mount in the palm thereof an incandescent light 28 connected with the storage batteries of the machine by wires 29 in any convenient manner, a switch of appropriate type being fitted in connection therewith for cutting out or switching on the light as desired.

The operation of the device is briefly as follows: Assuming the signalling hand 14 is in the normal position as shown by the dotted lines in Figure 2 it will be readily understood that when the driver desires to move said hand 14 into signalling position the handle 18 is pushed laterally outwards until the collar 22 abuts the inner end of the tubular coupling 12 whereupon a further slight pressure will cause the half portion 15 to be longitudinally moved relative to the half portion 16 which will through the pin 26 and cam slot 27 effect the swinging of the hand 14 from the normally pendent to the substantially horizontal or signalling position as shown in Figure 2. It will of course be understood that the movement of the rod a axially outwards moves the hand 14 from behind the shield or angle plate 13 prior to the swing of same horizontally as just described. A reverse movement inwards will effect the return of the hand 14 to normal pendent position when the collar 21 abuts the outer end of the tubular coupling 12.

From the foregoing description and an examination of the drawings it will be readily seen that by my invention there is provided a simple and very efficient auto-signal which will be found particularly adapted for fitment on closed or covered vehicles, and by the use of which a direction indication can be given without opening the window or door. Still further it is to be observed that whilst there has been shown and described one practical embodiment of my invention the same is susceptible of various changes in the form, proportions and minor details of construction, and the right is hereby reserved to make such changes and other modifications as properly fall within the scope of the appended claims.

Having described my invention, what I claim as new and desire to secure by Letters Patent is:

1. A direction signal comprising a support and means for connecting the same to a vehicle, a longitudinally split rod journaled in said support and diametrically separated into two half portions one part thereof being adapted for limited longitudinal displacement relative to the other part, an angle plate shield mounted on one side of the support, a signal arm pivoted to one part of the split rod and having a cam slot therein, said signal arm being adapted for oscillatory movement by means of a pin carried by the other part and engaging in the cam slot aforesaid, and adjustable spacing collars secured to half of the split rod for arresting its reciprocation to effect the oscillation of the signal arm from non-signalling to signalling position and vice versa.

2. A direction signal comprising a support and means for connecting the same to a vehicle, a longitudinally split rod journaled in said support and diametrically separated into two half portions one part thereof being adapted for limited longitudinal displacement relative to the other part, an angle plate shield mounted on one side of the support, a signal arm pivoted to one part of the split rod and having a cam slot therein, said signal arm being adapted for oscillatory movement by means of a pin carried by the other part and engaging in the cam slot aforesaid, spaced pins inserted in the one half part of the split rod for maintaining the two halves thereof in separated relation, and adjustable spacing collars secured to half of the split rod for arresting its reciprocation to effect the oscillation of the signal arm from non-signalling to signalling position and vice versa.

3. A direction signal comprising a support and means for connecting the same to a vehicle, a longitudinally split rod journaled in said support and diametrically separated into two half portions one part thereof being adapted for limited longitudinal displacement relative to the other part, an angle plate shield mounted on one side of the support, a signal arm pivoted to one part of the split rod and having a cam slot therein, said signal arm being adapted for oscillatory movement by means of a pin carried by the other part and engaging in the cam slot aforesaid, spaced pins inserted in the one half part of the split rod for maintaining the two halves thereof in separated relation, and an incandescent light supported by the signal arm for illuminating the same after dark.

4. A direction signal comprising a support and means for connecting the same to a vehicle, a longitudinally split rod journaled in said support and diametrically separated into two half portions one part thereof being adapted for limited longitudinal displacement relative to the other part, an angle plate shield mounted on one side of the support, a signal arm pivoted to one part of the split rod and having a cam slot therein, said signal arm being adapted for oscillatory movement by means of a pin carried by the other part and engaging in the cam slot aforesaid, spaced pins inserted in the one half part of the split rod for maintaining the two halves thereof in separated relation, and clamping means carried by the aforesaid support for connecting the device to the windshield of an automobile.

5. A direction signal comprising a support and means for connecting the same to a vehicle consisting of a bracket connected to said support and clamping jaws appropriately pivoted on a pin on said bracket, a tubular coupling journaled in said support adapted to hold said support in a vertical position, a longitudinally split rod journaled in said support and diametrically separated into two half portions one part thereof being adapted for limited longitudinal displacement relative to the other part and an angle plate shield mounted on one side of the support, a signal arm pivoted to one part of the split rod and adapted for oscillatory movement by the other part thereof, said signal arm being pivotally mounted between the split outer end of the half portion of the rod and operably connected to the other half portion by means of a pin engaging in a cam slot therein.

6. A direction signal comprising a support and means for connecting the same to a vehicle, a longitudinally split rod journaled in said support and diametrically separated into two half portions one part thereof being adapted for limited longitudinal displacement relative to the other part, adjustable spacing collars secured to half of the split rod, the signal arm pivoted to one part of the split rod and having the cam slot therein, said arm being adapted for the oscillatory movement by means of pins carried by the other part and engaging a cam slot, spaced pins inserted in the one half part of the split rod for maintaining the two halves thereof in separate relation and an incandescent lamp centrally arranged in said arm for illuminating the same after dark.

7. A direction signal comprising a support and means for connecting the same to a vehicle, a longitudinally split rod comprising two half portions, spaced collars connectable to said rod by means of screws passing through openings formed in one of the half portions to limit its longitudinal movement, a tubular coupling journaled in said standard centrally of said rod, said rod being arranged for axial sliding movement through the tubular coupling, an angle plate arranged between one part of said coupling and the standard and a signaling arm normally reposed thereon, an operating handle connected to one portion of the split rod and secured thereto by means of screws, the signaling arm being pivotally mounted between the split outer end of the half portion of the rod and operably connected with the other half portion, an incandescent lamp arranged centrally in the signaling arm and connected to the storage battery of the machine, and wires forming said connection.

In testimony whereof I affix my signature.

LOUIS M. KOLB.